Patented Jan. 23, 1951

2,539,212

UNITED STATES PATENT OFFICE 2,539,212

GAS FADING INHIBITORS FOR CELLULOSE DERIVATIVE DYES

Albert F. Strobel, Phillipsburg, and William W. Williams, Easton, Pa., assignors to General Aniline & Film Corporation, New York, N. Y., a corporation of Delaware No Drawing. Application November 5, 1948, Serial No. 58,603

4 Claims. (Cl. 8—61)

The present invention relates to the treatment of cellulose derivatives, such as cellulose esters and ethers for the purpose of improving the fastness to gas fading of colors applied thereto.

It is well known that many cellulose derivative dyes which are otherwise desirable suffer from the disadvantage that they are not fast to gas fumes, that is, the dyeings produced therewith become duller and change shade after exposure to such gases. While this phenomenon is not restricted to blue dyes derived from anthraquinone, it is particularly noticeable with such dyes because the gas fading effect is found to be more marked in the blue region of the spectrum. The anthraquinone blues and violets on cellulose derivatives have the characteristic of being extremely fast to light, washing, dry-cleaning, and the like, and are the most desirable dyes on cellulose derivatives excepting for the peculiarity that they possess of changing to a pink or gray shade in the presence of coal gas.

This tendency of dyeings on cellulose derivatives to undergo fading when subjected to gas fumes has been recognized for many years, and since the advent of U. S. P. 1,723,230 in 1929, many organic and inorganic bases have been proposed as inhibitors for such gas fading. While many of the compounds so suggested have attributes which recommend their use in the stated relationship, nevertheless none of the compounds have all of the attributes necessary to permit them to completely fulfill the task of inhibiting gas fading to the degree desired in commercial application.

It is recognized that the ability of a compound to inhibit gas fading is proportional to the amount of the basic groups that a compound is capable on a weight basis of introducing into a cellulose derivative. For example, dimethylamine is theoretically capable of introducing more basic groups on a weight basis than more complex amines suggested as inhibitors for gas fading. Unfortunately, however, dimethylamine is too soluble in water to be completely extracted from water by cellulose derivatives.

U. S. P. 2,017,199 discloses as inhibitors for gas fading various aralkylamines. However, due to the large amount of such compounds which are necessary to inhibit gas fading, and due to the only moderate fastness to washing, dry-cleaning and sublimation of such compounds, they have found little commercial use as inhibitors.

Diphenyl ethylene diamine is suggested in U. S. P. 2,416,380. This compound, while permanent, has the marked peculiarity that it tends to develop a color of its own on exposure to gas fumes as a consequence of which it changes a pastel blue dyeing to a green shade.

There are many requirements which a gas fading inhibitor must meet in order to be acceptable from a practical standpoint. These requirements are as follows:

1. It must prevent fading of the dyed cellulose derivative when exposed to gas.

2. It must be and remain colorless, i. e., introduce no color of its own when exposed to gas. (This criterion, as noted above, is important for pastel dyeings where any color introduced by the inhibitor would effect a marked change in shade.)

3. It must give no discoloration on prolonged exposure to sunlight.

4. It must be fast to dry-cleaning and wet washing.

5. It must be fast to sublimation.

6. It must be odorless and non-toxic.

7. It should be suitable for direct dyeing along with the dye in the dye bath, and to this end it must exhaust from the dye bath by having a natural affinity for cellulose derivatives and be capable of being suitably emulsified or dispersed in water to insure level dyeing.

When these factors are added up, it is no wonder that the art has been searching so fruitlessly for so many years in order to obtain a gas fading inhibitor which will be eminently satisfactory from a commercial standpoint.

We have now discovered that products which meet all of the above requirements and therefore meet the needs of the art as a gas fading inhibitor for dyeings on cellulose derivatives are symmetrical dibenzyl ethylene diamines in which the nitrogen atoms are further substituted by an aliphatic radical. The employment of such products for the purpose of inhibiting the gas fading of dyeings on cellulose derivatives accordingly constitutes the purpose and object of the present invention.

The compounds which are contemplated for use herein as gas fading inhibitors may be characterized by the following general formula:

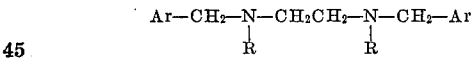

wherein Ar is a phenyl radical, i. e., phenyl, alkylphenyl such as toluyl, ethylphenyl and the like, halogenphenyl, i. e., chlorophenyl, bromophenyl, dichlorophenyl, dibromophenyl and the like, alkoxyphenyl, i. e., anisyl, ethoxyphenyl, propoxyphenyl and the like, carbalkoxyphenyl, i. e., carbmethoxyphenyl, carbethoxyphenyl, carbpropoxyphenyl and the like, aryloxyphenyl, i. e., phenoxyphenyl, methylphenoxyphenyl and the like, cyanophenyl, etc., and R is an aliphatic radical, i. e., alkyl such as methyl, ethyl, propyl, butyl, amyl, hexyl, heptyl and the like, alkylene, such as allyl, crotyl, 1-methyl-3-butenyl, hexenyl, and the like, alkoxyalkyl, i. e., ethoxymethyl, methoxyethyl, methoxypropyl, ethoxyethyl and the like, cyanoalkyl, i. e., cyanomethyl, cyanoethyl, cyanopropyl and the like, carbalkoxyalkyl, i. e., carbmethoxymethyl, carbethoxymethyl, carbpropoxymethyl, carbethoxyethyl and the like. It is to be pointed out, however, that the aliphatic radical represented by R should be free from halogen.

The products embraced by the above formula are for a large part known products, such as, for example, N.N'-dibenzyl-N.N'-diethyl ethylene diamine. In any case the products can be readily made by conventional methods. One such method involves the reaction of ethylene chloride with the desired primary aliphatic amine, such as methylamine, ethylamine, or the like, the separation of the symmetrical dialkylamine by fractionation from excess amines and higher condensation products, and the benzylation of the symmetrical dialkylamine with the desired benzyl chloride. The resulting symmetrical dibenzyl-dialkyl-ethylene diamine may be then separated by extraction with dilute aqueous hydrochloric acid, filtered, rendered basic with sodium hydroxide, and separated from the aqueous layer by filtration.

Conversely the products may be prepared by condensing benzaldehyde or a desired derivative thereof with ethylene diamine to yield a sym-dibenzal derivative. The sym-dibenzal derivative is then reduced to sym-dibenzyl ethylene diamine by means of sodium and alcohol. The dibenzyl ethylene diamine so prepared is then converted into the desired sym-dibenzyl-dialkyl ethylenediamine by an autoclave reaction with a halide of an aliphatic compound, the aliphatic group of which is to be introduced into the dibenzyl ethylene diamine. The end product is then recovered by fractional distillation.

Examples of compounds within the above category and which we have found satisfactory for our purposes are:

1.

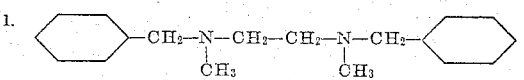

N.N'-dibenzyl-N.N'-dimethyl ethylenediamine.

2. N.N'-dibenzyl-N.N'-diethyl ethylenediamine.
3. N.N'-dibenzyl-N.N'-dipropyl ethylenediamine.
4. N.N'-dibenzyl-N.N'-di-isobutyl ethylenediamine
5.

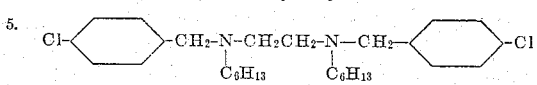

N.N'-di-(4-chlorobenzyl)-N.N'-dihexyl ethylenediamine.

6.

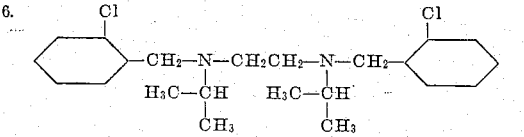

N.N'-di-(2-chlorobenzyl)-N.N'-di-isopropyl-ethylenediamine.

7. N.N'-dibenzyl-N.N'-di-allyl-ethylenediamine.
8. N.N'-dibenzyl-N.N'-di-crotyl-ethylenediamine.
9.

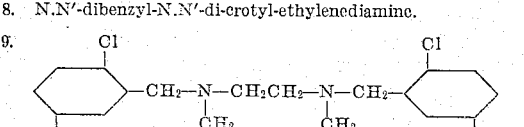

N.N'-di-(2.5-dichlorobenzyl)-N.N'-di-ethoxyethyl-ethylenediamine.

10. N.N'-dibenzyl-N.N'-di-methoxypropyl-ethylenediamine.
11.

$H_5C_2OOC$-⬡-$CH_2$-N-$CH_2CH_2$-N-$CH_2$-⬡-$COOC_2H_5$
                $C_6H_{13}$         $C_6H_{13}$

N.N'-di-(4-carbethoxy-benzyl)-N.N'-di-hexyl-ethylenediamine.

12.

CN-⬡-$CH_2$-N-$CH_2CH_2$-N-$CH_2$-⬡-CN
         $H_3C$-CH        $H_3C$-CH
         $CH_2$           $CH_2$
         $CH_3$           $CH_3$

N.N'-di-(4-cyanobenzyl)-N.N'-di-(sec-butyl)-ethylenediamine.

13.

$OCH_3$                        $OCH_3$
⬡-$CH_2N$——$CH_2CH_2$——N-$CH_2$-⬡
HC—$CH_3$        $H_2C$—CH
Br  CH=CH    HC=CH    Br
    $CH_3$    $CH_3$

N.N'-di-(2-methoxy-5-bromobenzyl)-N.N'-di-(1-methyl-2-butenyl)-ethylenediamine.

14. N.N'-di-(4-phenoxybenzyl)-N.N'-diethyl ethylenediamine.
15. N.N'-di-(3-cyanobenzyl)-N.N'-dibutyl-ethylenediamine.
16. N.N'-di-(2.5-dichlorobenzyl)-N.N'-dimethyl-ethylenediamine.
17. N.N'-dibenzyl-N.N'-di-ethoxymethyl-ethylenediamine.
18. N.N'-dibenzyl-N.N'-di-cyanoethyl-ethylenediamine.
19.

Cl-⬡-$CH_2$-N-$CH_2CH_2$-N-$CH_2$-⬡-Cl
        $CH_2$         $CH_2$
        $COOCH_3$     $COOCH_3$

N.N'-di-(4-chlorobenzyl)-N.N'-di-(carbomethoxy-methyl)-ethylenediamine.

20. N.N'-dibenzyl-N.N'-di-(carbethoxy-propyl)-ethylenediamine.

The invention is explained by the following examples but it is to be understood that the invention is not restricted thereto.

Example 1

2 parts of a mixture of N.N'-dibenzyl-N.N'-dimethyl ethylenediamine (80%) and a surface active agent comprising the addition product of ethylene oxide with diisobutyl-phenol (20%) are added to a dye bath containing .6 part of 1-methylamino-4-ethylamino anthraquinone, 40 parts of a 5% aqueous solution of the condensation product of oleic acid chloride and N-methyltaurine, 5000 parts of water (50° C.) and 100 parts of cellulose acetate silk fabric. The temperature is gradually raised to 85° C. after which the fabric is worked for 1 hour in the bath at 85° C. After the dyeing is complete, the silk is removed, washed and dried. The dyed cloth has an excellent resistance to gas fading.

The above surface active addition product of ethylene oxide may be prepared according to U. S. P. 2,213,477.

Example 2

The procedure is the same as in Example 1 excepting that the N.N'-dibenzyl-N.N.'-dimethyl ethylene diamine is replaced by N.N'-di-(4-chlorobenzyl)-N.N'-dihexyl ethylene diamine. Here again the dyed cloth resists gas fading to a very marked degree.

Example 3

100 parts of cellulose acetate silk previously dyed with 1.4-di-mono-methylamino anthraquinone is placed in a bath of 5000 parts of water at 50° C. containing 40 parts of a 5% aqueous solution of the condensation product of oleic acid chloride and N-methyl taurine. To this bath is added 4 parts of a mixture of N.N'- dibenzyl-N.N'-diethyl-ethylene diamine (80%) and the aforesaid addition product of ethylene oxide and diisobutyl phenol (20%). The bath temperature is gradually raised to 85° C. and this temperature is maintained for ½ hour. After this the cloth is withdrawn, rinsed and dried. The dyed cloth shows excellent resistance to gas fading.

*Example 4*

The procedure is the same as in Example 3 excepting that the N.N'-dibenzyl-N.N'-diethyl ethylenediamine is replaced by N.N'-dibenzyl-N.N'-dicrotyl ethylenediamine. The results are similar to those obtained in Example 3.

*Example 5*

The procedure is the same as in Example 1 excepting that the N.N'-dibenzyl-N.N'-dimethyl ethylenediamine is replaced by N.N'-di-(2.5-dichlorobenzyl) - N.N'-dimethoxyethyl ethylenediamine. The dyed cloth exhibits similar resistance to gas fading to that shown in Example 1.

It is to be understood that the above examples may be repeated with similar results while utilizing any of the symmetrical ethylenediamines listed above.

Various modifications of the invention will occur to persons skilled in the art. For example, dyes either anthraquinone or azo other than those mentioned above may be employed. Examples of such additional anthraquinone dyes are:

1.4-dinaphthylamino anthraquinone
1-methylamino-4-anthraquinone diamino chrysazin
1.4-bis-(2-hydroxyethylamino) anthraquinone
1-amino-4-cyclohexylamino - 2 - anthraquinonecarboxamide
1.4.5.8-tetramino anthraquinone and the like.

Suitable azo dyes are:

4-(2-bromo-4.6-dinitrophenylazo) - N.N - diethyl-5-methyl-o-anisidine
4-(2-chloro-4.6 - dinitrophenylazo)-1-naphthylamine
6-(6-methoxy-2-benzothiazolylazo) -1.2.3.4-tetrahydro-3-hydroxybenzo[h] quinoline
4-(2-hydroxy-4-nitrophenylazo) - N.N - di-(2-hydroxyethyl)-m-toluidine
6-(2-bromo-4.6-dinitrophenylazo) -3-hydroxy-7-methyl-N-secondary butyl-1.2.3.4-tetrahydroquinoline
4-(2.4-dinitrophenylazo) - N.N - di - (2-hydroxyethyl)-m-toluidine and the like.

Further other materials than those mentioned may be used with the anti-acid faders in question, i. e., fibers or fabrics containing a cellulose ester such as cellulose formate, cellulose propionate, cellulose butyrate, cellulose-acetate-propionate, cellulose-acetate-butyrate, or cellulose ethers such as cellulose methyl ether, cellulose ethyl ether, cellulose benzyl ether, and the like. We accordingly do not intend to be limited in the patent granted except as necessitated by the appended claims.

We claim:

1. The process for the treatment of organic derivatives of cellulose which are dyed after the formation of fibers therefrom to render the dyeings carried thereby resistant to gas fading, which comprises treating such cellulose derivative at any stage after the formation of fibers therefrom with an aqueous dispersion of a compound having the following formula:

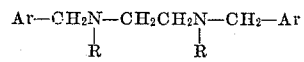

wherein Ar is a phenyl radical, and R is an aliphatic hydrocarbon radical.

2. The process for rendering dyeings applied to organic derivatives of cellulose resistant to gas fumes which comprises treating said derivatives in the form of fibers or fabrics with a bath containing a dyestuff and a compound of the following formula:

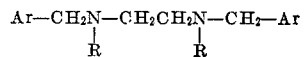

in which Ar is a phenyl radical and R is an aliphatic hydrocarbon radical.

3. The process as defined in claim 1 wherein there is employed an aqueous dispersion of N.N'-dibenzyl-N.N'-dimethyl ethylenediamine.

4. The process as defined in claim 1 wherein there is employed an aqueous dispersion of N.N'-dibenzyl-N.N'-diethyl ethylenediamine.

ALBERT F. STROBEL.
WILLIAM W. WILLIAMS.

REFERENCES CITED

The following references are of record in the file of this patent:

UNITED STATES PATENTS

| Number | Name | Date |
| --- | --- | --- |
| 1,930,232 | Ellis | Oct. 10, 1933 |
| 2,008,902 | Ellis | July 23, 1935 |
| 2,017,119 | Ellis | Oct. 15, 1935 |
| 2,083,122 | Olpin | June 8, 1937 |
| 2,298,401 | McNally | Oct. 13, 1942 |
| 2,416,380 | Collie | Feb. 25, 1947 |